July 22, 1941.  W. H. SILVER  2,249,864
DAM FORMING DEVICE
Filed July 28, 1938  3 Sheets-Sheet 1

INVENTOR.
WALTER H. SILVER
ATTORNEYS

July 22, 1941.  W. H. SILVER  2,249,864
DAM FORMING DEVICE
Filed July 28, 1938  3 Sheets-Sheet 2
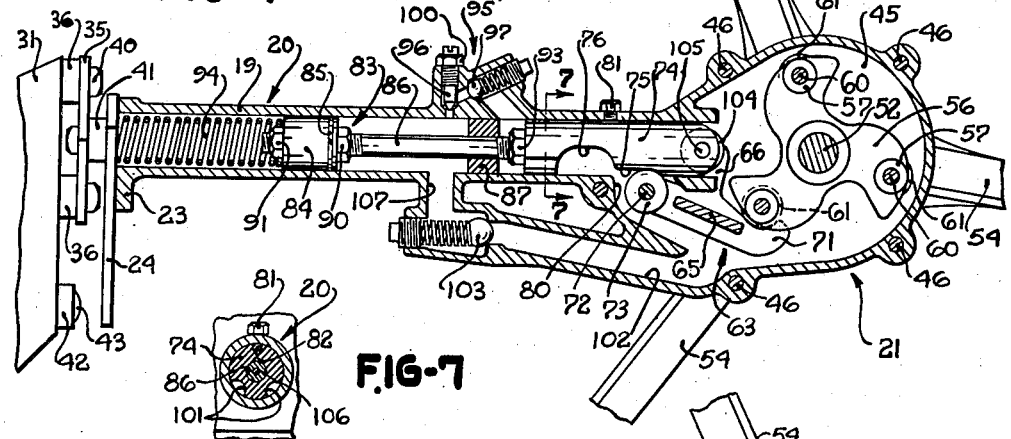
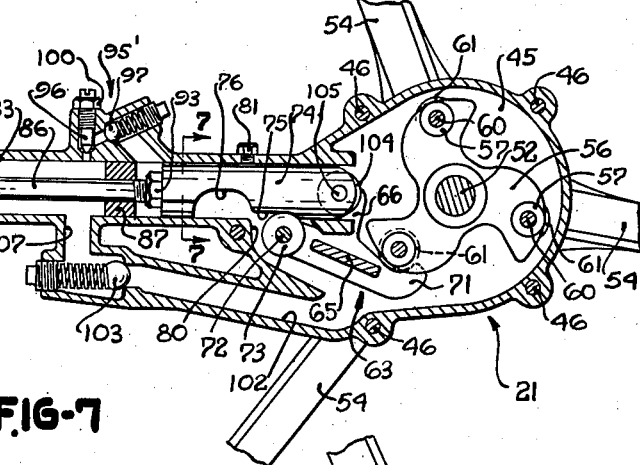
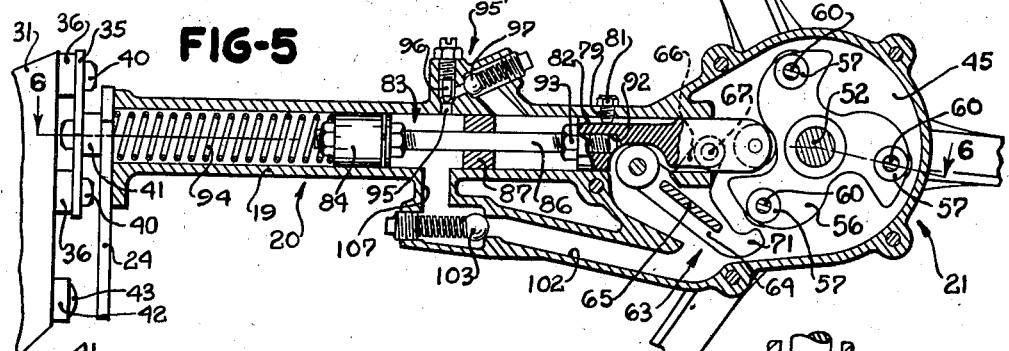
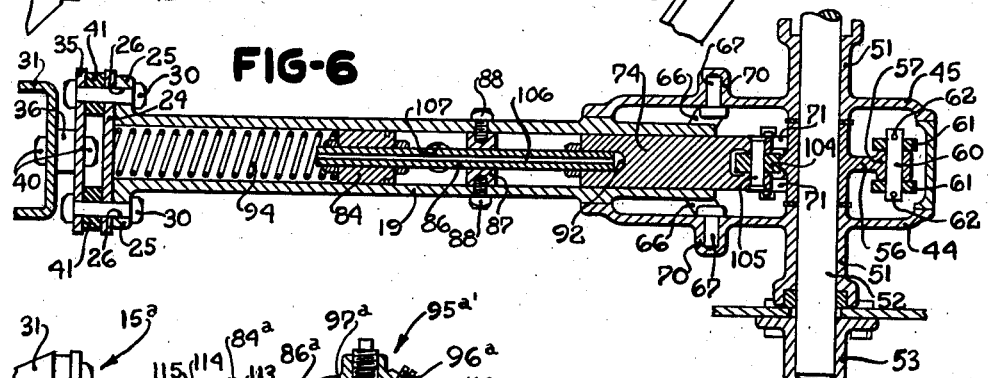
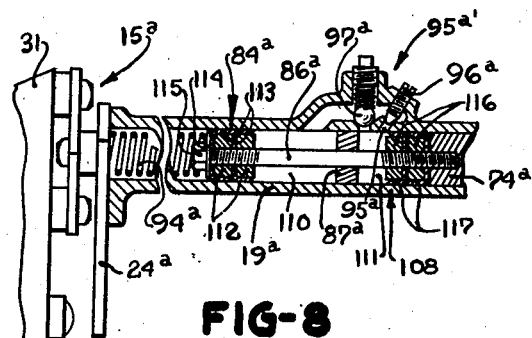
INVENTOR.
WALTER H. SILVER
ATTORNEYS

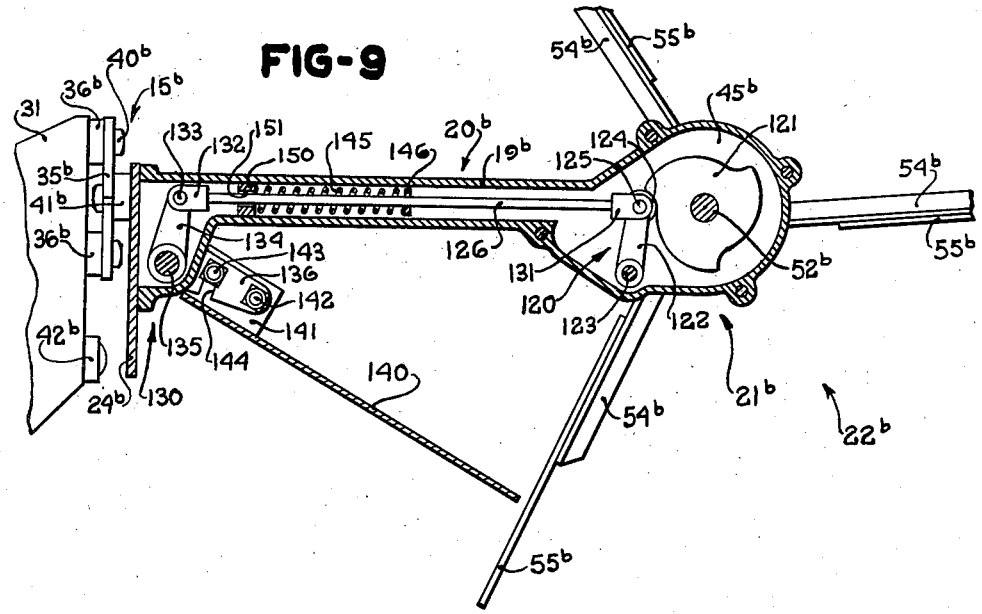
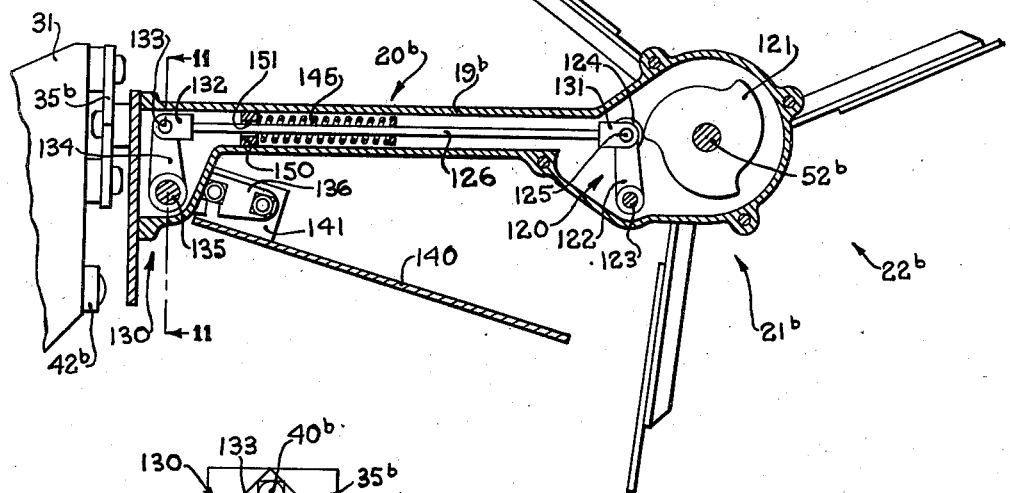

Patented July 22, 1941

2,249,864

UNITED STATES PATENT OFFICE 2,249,864

DAM FORMING DEVICE

Walter H. Silver, Moline, Ill., assignor to Deere & Company, Moline, Ill., a corporation of Illinois Application July 28, 1938, Serial No. 221,753

33 Claims. (Cl. 97—55)

The present invention relates to dam forming devices and is more particularly concerned with damming attachments of the type used behind a furrow forming implement such as a lister. The principal object of the present invention is to provide a new and improved damming device adapted to operate in the furrow formed by the implement to which it is attached and to accumulate loose soil from the sides thereof for making dams across the furrow. More specifically, it is an object of the present invention to provide enclosed operating mechanism which is protected from the dirt and is adapted to operate in an oil bath, thereby increasing the efficiency of the implement and adding to its life.

Another object is to provide a dam forming device of the type controlled by a gauging arm which releases the blade when the height of the pile of collected soil reaches a certain value, and which has enclosed detent mechanism actuated by the gauging arm.

Another object of the present invention is to provide in a dam forming device having a scraper blade assembly rotatable out of and into earth engaging position, means for holding the assembly against rotation and in earth engaging position for a predetermined time interval and then releasing the assembly to permit dumping accumulated soil across the furrow to form a dam. In the accomplishment of this object I have provided detent means for normally holding the scraper blade assembly against rotation and dash pot means co-acting with said detent means to disable the latter at regularly spaced time intervals. Thus, by adjusting the dash pot mechanism to the desired speed of operation, the dams are spaced evenly along the length of the furrow for any given speed of the propelling tractor.

Another object of the present invention is to provide a resilient connection for attaching a damming device to a furrow forming implement so that a limited amount of vertical and lateral swinging is permitted to allow the damming device to follow a crooked or curving furrow without exerting undue pressure against the side walls thereof.

These and other objects and advantages of the present invention will become apparent to those skilled in the art after a consideration of the following detailed description of the embodiments thereof illustrated in the appended drawings. In the drawings:

Figure 4 is a sectional view taken substantially along line 4—4 of Figure 1 and showing the scraper blade assembly held against rotation by the detent means;

Figure 5 is a view similar to Figure 4, showing the scraper blade assembly released by the detent means and free to rotate;

Figure 6 is a sectional view taken substantially along the line 6—6 of Figure 5;

Figure 7 is a sectional view taken along the line 7—7 of Figure 4;

Figure 8 is a sectional view of the dash pot mechanism of another embodiment of the present invention;

Figure 9 is a sectional side view taken along the line 9—9 of Figure 3, showing the scraper blade assembly held against rotation by the detent mechanism;

Figure 10 is a view similar to Figure 9, showing the scraper blade assembly released by the detent mechanism and free to rotate; and Figure 11 is a view taken along the line 11—11 of Figure 10.

Figure 1:
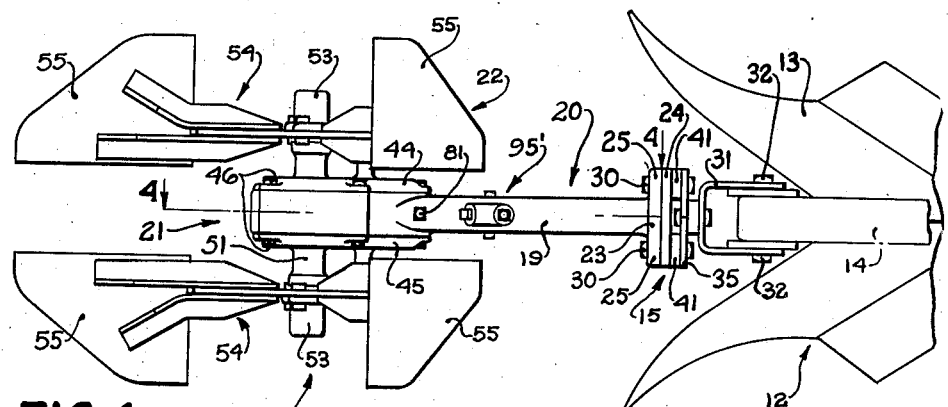
Figure 1 is a plan view of a damming attachment embodying the principles of the present invention and actuated by time controlled mechanism and mounted behind a lister.

Referring now to the drawings and more particularly to Figures 1, 2, 4, 5, 6 and 7, the reference numeral 12 indicates a furrow forming implement such as a lister, having a double moldboard plow bottom 13 which is carried at the lower end of a downwardly extending tool shank 14. Attached to the implement 12 by a flexible draft connection 15 is a dam forming device, indicated in its entirety by the reference numeral 16, which includes a fore and aft extending draft member 20 provided with an enclosed housing portion 21, and a rotary scraper blade assembly indicated generally by the reference numeral 22. The forward portion of the draft member 20 is preferably in the form of a cylindrical sleeve 19 and is provided at its forward end with a base portion 23 to which a generally triangularly-shaped plate 24 is fixed, as by welding, with its apex pointing downward. The base 23 of the draft member 20 is provided with laterally extending ears 25 which are apertured as at 26 to receive connecting bolts 30. The aperture 26 also extends through the plate 24.

A U-shaped bracket member 31 engages the tool shank 14 from the back side thereof and is bolted to the tool shank by two vertically spaced bolts 32, 33, the latter passing through an arcuate slot 34 in the bracket member 31 which provides for a limited amount of angular adjustment of the bracket member 31 relative to the tool shank 14. The flexible draft connection 15 also includes an intermediate member 35, preferably in the form of a square plate which is disposed with its opposite corners on horizontal and vertical axes, respectively. A pair of vertically spaced pads or bushings 36 of rubber or other suitable resilient material are disposed between the back of the bracket member 31 and the plate 35 adjacent the vertically spaced corners of the latter. Connecting bolts 40 are passed through aligned apertures provided in the plate 35, bracket member 31, and rubber bushings 36. A pair of laterally spaced rubber bushings 41 are disposed between the laterally spaced corners of the plate 35 and the plate 24, and connecting bolts 30 are passed through suitable aligned apertures to secure the base of the draft member 20 to the plate 35. Thus, the damming device 16 is permitted a limited amount of lateral swinging about the two vertically spaced rubber bushings 36, while vertical swinging is taken care of by the two laterally spaced double bushings 41. When the implement 12 is raised out of the ground to transport position, the weight of the damming device causes the latter to swing downwardly about the bushings 41, and this movement is limited by another rubber bushing 42 secured to the bracket 31 by a round headed bolt 43 in such a position that the apex of the plate 24 bears against the head of the bolt 43 and is limited against further movement thereby, while the rubber bushing 42 serves as a cushion to absorb road shocks while the implement is in transit.

The rear housing portion 21 of the draft member 20 includes a pair of side walls 44 and 45 which are bolted to the sides of the housing portion 21 by a plurality of bolts 46, and each of the side walls is provided with a transversely disposed bearing portion 51. Journaled in the aligned bearing portions 51 is a transverse shaft 52 which extends laterally from opposite sides of the housing portion 21 to carry the rotary scraper blade assembly 22.

Figure 2:
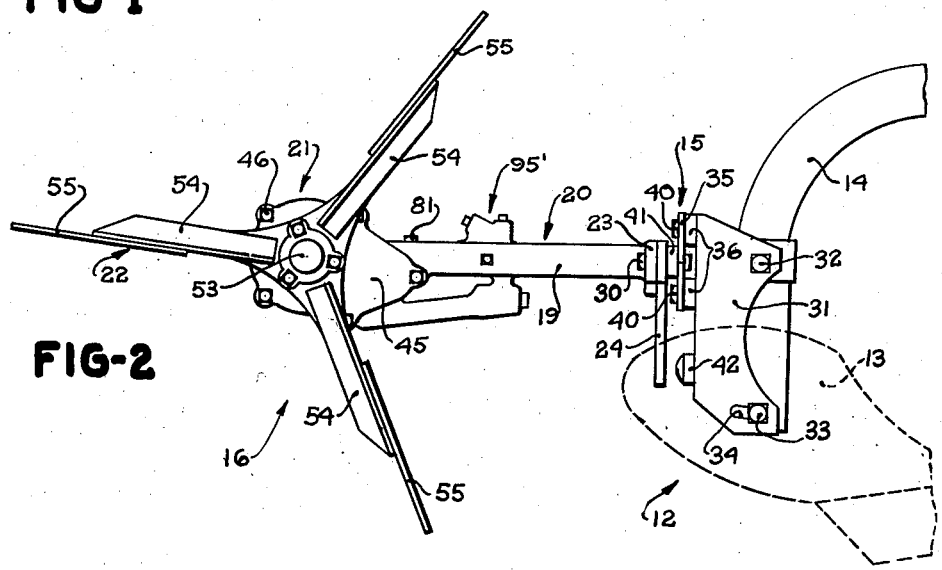
Figure 2 is a side elevation of the implement shown in Figure 1.
Figure 3:
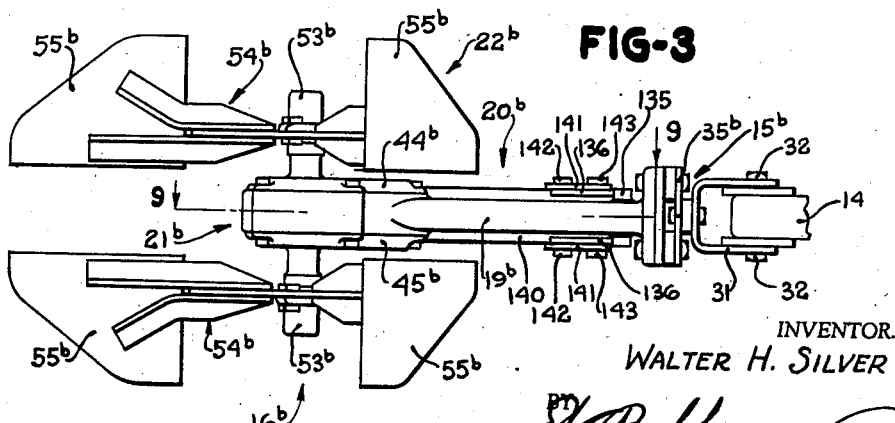
Figure 3 is a plan view of another embodiment of the present invention, in which a gauging arm is employed to control the detent mechanism.

In the preferred embodiment shown and described herein, the rotary scraper blade assembly 22 comprises three scraper tools spaced around the axis of the shaft 52 at 120° to each other. Each of the scraper tools comprises a pair of complementary blades 55 disposed on opposite sides of the housing portion 21 and spaced apart to provide a slot between them to receive the draft member 20 when the blade assembly 22 is rotated. The blades 55 are carried on radiating support arms 54 which are suitably fixed on hubs 53, and the latter are fixed, in turn, on their respective end portions of the shaft 52. The edges of the scraper blades 55 are tapered to conform approximately to the sides of the furrow formed by a tool 13 and in normal operative position one of the scraper tools is held in ground engaging position sloping upwardly at a slight angle rearwardly from the vertical, as shown in Figure 2.

The mechanism for holding the rotary scraper blade assembly 22 against rotation and periodically releasing said assembly to permit the blades 55 to deposit accumulated soil across the furrow, includes a cam 56 which is fixed to the shaft 52 within the housing portion 21 and is provided with one lobe for each of the three scraper tools. Each of the lobes of the cam 56 is provided with a boss 57 which is apertured to receive a transverse pin 60, and journaled on the pin 60 on opposite sides of the boss 57 are two rollers 61 which are held in place by cotter pins 62 passed through the pin 60.

A detent member indicated generally by the reference numeral 63, comprises a pair of side members 64 having support arms 66 and a connecting transverse web 65. The detent 63 is pivotally supported within the housing portion 21 by means of pins 67 which project laterally from the ends of the arms 66 and are journaled in suitable bearing bosses 70 provided in the side walls 44 and 45. The rear end of each of the side members 64 is curved upwardly to provide a hook 71, which is adapted to engage its respective cam roller 61 and thereby hold the cam 56 and shaft 52 against rotation. A transverse pin 72 extends between and is fixed to the side members 64 at the front ends thereof, and journaled on this pin is a roller 73, the purpose of which will be disclosed shortly.

Slidably disposed within the sleeve 20 is a limit stop 74 in the form of a cylindrical plunger, which is provided on its underside with a flattened portion 75 extending along a portion of the length thereof and terminating in a deep recess 76 near the forward end of the limit stop. The cylindrical sleeve 19 extends into the housing portion 21 for a short distance and is apertured at 80 to permit the roller 73 of the detent member 63 to bear against the underside of the limit stop 74. When the limit stop 74 is in a forward position, as shown in Figure 4, the roller 73 bears against the flat portion 75 holding the detent hook 71 in engagement with the cam rollers 61. As the limit stop 74 reaches its rearwardmost position, as shown in Figure 5, the recess 76 comes into register with the aperture 80, and the pressure of the cam rollers 61 against their respective detent hooks 71 causes the detent member 63 to pivot about the axis of the pins 67 and the roller 73 to drop into the recess 76. The limit stop 74 is prevented from rotating within the sleeve 20 by means of a guide bolt 81 which is screwed into a threaded aperture 79 in the wall sleeve 20 and projects beyond the inner surface of the sleeve, slidably engaging a guide slot 82 provided in the limit stop 74.

The limit stop 74 is moved from the forward position shown in Figure 4 to the rearward position shown in Figure 5 by means of a dash pot controlled spring mechanism, indicated generally by the reference numeral 83 and including a piston 84 which is slidably disposed within the cylindrical sleeve 19. A piston ring 85 carried in a suitable groove in the piston 84 seals the latter against excessive leakage of fluid. The piston 84 is apertured to receive a piston rod 86 which is threaded at both ends, and is secured to one end thereof by means of two nuts 90 and 91 in threaded engagement with the piston rod and bearing against opposite sides of the piston. The other end of the rod 86 is screwed into a threaded aperture 92 in the limit stop 74 and is secured by a lock nut 93. Separating the piston 84 from the limit stop 74 is a dividing wall 87, preferably in the form of a bushing sleeve apertured to receive the piston rod 86, and held in place within the cylindrical sleeve 19 by means of two opposed bolts 88 which are screwed into aligned threaded apertures in the wall of the sleeve 19 and bushing 87. The piston 84 is urged rearwardly by a compression spring 94 which is disposed within the cylindrical sleeve 20 between the plate 24 and head of the piston 84.

Rearward movement of the piston 84 under the influence of the spring 94 is retarded by the flow of a suitable fluid, preferably a light lubricating oil, normally filling the space between the piston and dividing wall 87, passing through a restricted control orifice 95 provided in a by-pass 95' around the dividing wall 87. The orifice is controlled by a valve stem 96, which is adjustable to increase or decrease the size of the orifice through which the fluid must pass, and is held in proper adjustment by means of a lock nut 100. A ball check valve 97 is serially disposed in the by-pass connection 95' to permit the fluid to flow from the piston side of the dividing wall 87 to the opposite side thereof, while preventing the return flow of the fluid. On the limit stop side of the dividing wall 87, the fluid escapes through two hemicylindrical grooves 101 which extend from the back side of the limit stop 74 to the recess 76, and thence through the aperture 80 into the sump formed by the housing 21. When the piston 84 is reset from the rearward position illustrated in Figure 5 to the forward position shown in Figure 4, suction is created behind the piston causing the fluid to be drawn from the sump in the housing 21 through a passageway 102, past a ball check valve 103 and through an opening 107 into the space between the piston and the dividing wall 87. The check valve 103 prevents the flow of fluid from the piston side of the dividing wall 87 to the sump in the housing 21 when the piston is forced rearwardly by the spring 94.

The limit stop 74 and the piston 84 are reset when the scraper blade assembly 22 rotates, through the agency of a roller 104 carried in the bifurcated rear end of the limit stop 74 and journaled on a pin 105. When the limit stop 74 reaches its rearwardmost position, as shown in Figure 5, the roller 104 comes into contact with one of the low portions of the cam 56 and is limited thereby against further rearward movement. At this position of the stop 74, as explained before, the detent member 63 is free to pivot, releasing the detent hooks 71 from the cam rollers 61, whereby the scraper blade assembly 22 is allowed to rotate under the pressure of accumulated soil piled up in front of the scraper blades 55. As the cam 56 rotates, it bears against the roller 104 and forces the limit stop and piston back to their forward position, at the same time causing the detent member 63 to swing back to operative position in readiness to engage the succeeding pair of cam rollers 61.

It has been found in practice that a certain amount of fluid escapes past the ring 85 into the space between the piston and the plate 24, regardless of the care taken in fitting the piston ring. In order to prevent the fluid from filling this space to an undesirable extent whereby the operation of the piston might be impaired, means have been provided for draining the fluid off to the sump in the housing 21. The piston rod 86 is drilled from end to end to provide a passageway 106 to the aperture 92, and the latter is extended to open into the recess 76.

To increase the distance between dams, the operation of the dash pot mechanism 83 is slowed down by turning the needle valve 96 in to decrease the size of the control orifice 95 and thus retard the flow of fluid from the piston side of the dividing wall 87 to the limit stop side. Likewise, the distance between dams is shortened by turning the needle valve 96 out to increase the size of the control orifice. Thus it is evident that the control of the rotation of the blade assembly is responsive to time alone.

Another embodiment of the present invention having operating mechanism similar to that described above but with a modified form of dash pot mechanism, is illustrated in Figure 8. Parts corresponding to those in the preceding embodiment are given the same number with the suffix "a".

In this embodiment a second piston 108 is provided on the limit stop side of the wall 87a which cooperates with the first piston 84a to receive the fluid displaced by the latter and thus eliminates the need for an oil sump and return passageway. The effect of thus adding a second piston on the opposite side of the wall 87a is to create two cylinders 110, 111, which are connected by the control orifice 95a. The latter is controlled by a needle valve 96a and a ball check valve 97a is provided in parallel relation to provide a two-way by-pass providing a controlled flow of fluid during the timing stroke of the piston but permitting free flow of fluid from cylinder 111 to cylinder 110 when the limit stop and dash pot are being reset. The piston 84a comprises a pair of cylindrical bushings 112 in threaded engagement with the end of the piston rod 86a and having cup shaped seals 113, preferably of leather or like material, which encircle the bushing and are held in place by means of a washer 114 and nut 115. The washer 114 also serves as a base against which the spring 94a bears. Piston 108 likewise comprises a pair of cylindrical bushings 116 in threaded engagement with the rod 86a, and cup shaped seals 117.

Another embodiment of the present invention is illustrated in Figures 3, 9, 10 and 11, in which the mechanism for holding the scraper blade assembly against rotation is contained within the hollow draft member, while the scraper blade assembly is tripped and permitted to rotate, by means responsive to the height of the pile of earth accumulated in front of the scraper blades. Parts similar to those described in the preceding embodiments are given the same numbers with the suffix "b".

Referring now to Figures 3, 9, 10, and 11, a cam 121 which is fixed to the shaft 52b is engaged by a detent member 120 comprising a lever arm 122, which is pivotally supported at one end on a pin 123 carried by the side walls 44b and 45b, and the free end of the lever arm 122 is bifurcated to receive a roller 124, which is journaled on a pin 125. The roller 124 bears against the cam 121 and engages one of the lobes thereof to hold the cam and shaft 52b against rotation. The detent member 120 is held into engagement with the cam 121 and is periodically disengaged therefrom by means including a push rod 126 disposed within the cylindrical sleeve 20b and extending forwardly to a housing portion 130 provided in the base of the draft member. The rear end of the push rod 126 is provided with a bifurcated head 131 which is pivotally connected by the pin 125 to the detent member 120. The forward end of the push rod 126 is likewise provided with a bifurcated head 132 which is pivotally connected by a pin 133 to a lever arm 134. The latter is fixed on a transverse shaft 135 which extends through the side walls of the housing portion 130 and is journaled therein. Fixed on each of the outer ends of the shaft 135 is an arm 136 which extends downwardly and rearwardly therefrom. A float 140, preferably in the form of a bar having upturned flanges 141 at one end thereof, extends downwardly and rearwardly from the arms 136 to a point slightly ahead of the ground engaging tool 55b and disposed to operate within the space between the two laterally spaced complementary blades. The flanges 141 are secured to the arms 136 by means of bolts 142 and 143, one bolt 142 passing through aligned apertures in members 136, 141, and the other 143 passing through an aperture in 141 and an open ended arcuate slot 144 in the arm 136 to provide for angular adjustment of the float 140 relative to the arms 136 and thereby regulate the height of dam formed by the scraper blades 55b. It will be readily appreciated that the weight of the float 140 exerts a turning force upon the shaft 135, causing the push rod 126 to exert a force in the direction of the cam 121, thereby holding the detent member 120 into engagement with the cam. This force is augmented by a compression spring 145 which embraces the push rod 126 within the cylindrical sleeve 20b and bears against a collar 146 fixed thereto. The other end of the spring 145 bears against a shoulder 150 fixed to the inner surface of the sleeve 19b and having an aperture 151 through which the rod 126 extends.

The operation of this embodiment is as follows:

Normally, the rotary scraper blade assembly 22b is held with one of the scraping tools in ground engaging position, as shown in Figure 9, by means of the detent member 120 which is held in engagement with the cam 121 by the combined force exerted by the weight of the float 140 and spring 145. As soil is scraped from the sides of the furrow and accumulated in front of the blade 55b, the float 140 rests upon the top of the pile and rises as the latter increases in height. When the pile of accumulated soil reaches a predetermined height, the float 140 is raised to the position shown in Figure 10 in which the detent member 120 is disengaged from the cam 121 and the rotary scraper blade assembly 22b allowed to rotate, depositing the accumulated earth across the furrow to form a dam, after which the float drops and the detent 120 bears against the cam, and is in position to engage the succeeding lobe of the cam 121 to hold the assembly stationary.

What I claim as my invention and desire to secure by Letters Patent is:

1. A damming device comprising, in combination, a hollow draft member, a shaft journaled in said draft member and extending laterally therefrom, a scraper blade fixed on the extended portion of said shaft, a cam fixed on said shaft, detent means adapted to engage said cam and prevent said shaft from rotating, means disposed within said hollow draft member and operatively engaging said detent means to disengage the latter from said cam and permit said shaft to rotate, and means for intermittently actuating said detent means.

2. A damming device comprising, in combination, a fore and aft extending hollow draft member, a pair of laterally spaced bearings in said member, a transverse shaft journaled in and extending laterally beyond said bearings, a scraper blade fixed on the extended portion of said shaft, a cam fixed on said shaft and disposed within said hollow draft member, a detent member disposed within the draft member and adapted to engage said cam to prevent said shaft from rotating, means slidably disposed within said draft member and operable to disengage said detent member from said cam, and means for intermittently actuating said last named means.

3. A damming attachment for a furrow-forming implement comprising a fore and aft extending hollow draft member having closed ends to provide an enclosed housing, means for attaching the front end of said draft member to said implement, bearing means disposed in the side walls of the rear portion of said draft member, a transverse shaft journaled in said bearing means and extending laterally therefrom, a scraper blade fixed on the extended portion of said shaft, a cam fixed on said shaft and disposed within said draft member, detent means pivotally supported within said hollow draft member and adapted to engage said cam to prevent the latter from rotating, and means disposed within said hollow draft member for holding said detent means in engagement with said cam and periodically disengaging the detent means from the cam to allow said shaft to rotate.

4. A damming device comprising, in combination, a draft member having a hollow housing portion, a pair of laterally spaced bearings disposed in the side walls of said housing portion, a shaft journaled in said bearings and projecting laterally from opposite sides of said housing portion, a scraping tool fixed on said shaft and comprising a pair of blades disposed on opposite sides of said housing portion, a cam fixed on said shaft and disposed within said housing portion, and detent means contained within said housing and adapted to cooperate with said cam to control the rotation of said scraping tool.

5. A damming attachment for a furrow-forming implement comprising a draft member having an enclosed housing portion, means for connecting said draft member to said implement, a pair of laterally spaced bearings disposed in the side walls of said housing portion, a transverse shaft journaled in said bearings and extending laterally therefrom, a rotary scraper assembly fixed on said shaft and adapted to operate in the furrow formed by said implement to accumulate loose soil from the sides thereof for making dams in the furrow, said assembly comprising a pair of complementary blades disposed on opposite sides of said housing portion and spaced apart to provide a slot between them to receive said draft member during rotation of said assembly about the axis of said shaft, a cam fixed on said shaft and disposed within said housing portion, detent means disposed within said housing portion and adapted to engage said cam to hold said scraper assembly against rotation, means cooperative with said detent means for holding the latter in engagement with said cam, and means for periodically disabling said last named means.

6. A damming attachment for a furrow-forming implement comprising a draft member having an enclosed housing portion, means for connecting said draft member to said implement, a pair of laterally spaced bearings disposed in the side walls of said housing portion, a transverse shaft journaled in said bearings and extending laterally therefrom, a rotary scraper assembly fixed on said shaft and adapted to operate in the furrow formed by said implement to accumulate loose soil from the sides thereof for making dams in the furrow, said assembly comprising a plurality of scraper tools extending radially outward from said shaft and each of said tools having a pair of cooperative blades disposed on opposite sides of said housing and spaced apart to provide a slot between them to receive said draft member during rotation of said assembly about the axis of said shaft, means disposed within said housing portion for normally holding said shaft against rotation, and means cooperative with said holding means for periodically releasing said shaft to permit the latter to turn through a predetermined angle.

7. A damming device comprising, in combination, a draft member having a hollow housing portion, a shaft journaled in said housing portion and extending laterally therefrom, a rotary scraper tool fixed on the extended portion of said shaft, means disposed within said housing portion for normally holding said shaft against rotation, and means cooperative with said holding means for periodically releasing said shaft to permit the latter to turn through a predetermined angle.

8. A damming device comprising, in combination, a draft member having a hollow sleeve portion and an enclosed housing portion, a shaft journaled in said housing portion and extending laterally therefrom, a scraper blade fixed on the extended portion of said shaft, a cam fixed on said shaft and disposed within said housing portion, a detent member pivotally supported within said housing portion and adapted to engage said cam to hold said shaft against turning, a push rod disposed within said sleeve portion and axially movable relative thereto, said push rod cooperating with said detent member to hold the latter in engagement with said cam, and control means for moving said push rod relative to said sleeve to cause said detent member to release said cam.

9. A damming device comprising, in combination, a draft member having a hollow sleeve portion and an enclosed housing portion, a shaft journaled in said housing portion and extending laterally therefrom, a scraper blade fixed on the extended portion of said shaft, a cam fixed on said shaft and disposed within said housing portion, a detent member pivotally supported within said housing portion and adapted to engage said cam to hold said shaft against turning, a push rod disposed within said sleeve portion and axially movable relative thereto between operative and inoperative positions, said push rod co-acting with said detent member in operative position to hold the latter in engagement with said cam, and means for moving said push rod from said operative position to said inoperative position at intervals.

10. In a damming device the combination of a draft member, a transverse shaft journaled on said member, a dam forming tool fixed on said shaft and rotatable into and out of earth-engaging positions, and means for holding said tool in earth-engaging position for a predetermined time interval and then releasing said tool to deposit accumulated soil to form a dam, said holding means including a spring backed dash pot and operating connection between said dash pot and said dam forming tool.

11. A damming attachment for a furrow forming implement comprising, in combination, a draft member, means for attaching said draft member to said implement, a transverse shaft journaled on said draft member, a dam forming tool fixed on said shaft and adapted to operate in the furrow formed by said implement and accumulate loose soil from the sides thereof, said tool being rotatable out of operative position in said furrow to deposit said accumulated soil, a cam fixed on said shaft, detent means engaging said cam to hold said tool in operative position, and a spring backed dash pot operatively connected with said detent means to disengage the latter from said cam at predetermined time intervals.

12. A damming attachment for a furrow forming implement comprising, in combination, a draft member, means for attaching said draft member to said implement, a transverse shaft journaled on said draft member, a dam forming tool fixed on said shaft and adapted to operate in the furrow formed by said implement and accumulate loose soil from the sides thereof, said tool being rotatable out of operative position in said furrow to deposit said accumulated soil, a cam fixed on said shaft, detent means engaging said cam to hold said tool in operative position, a spring backed dash pot operatively connected with said detent means to disengage the latter from said cam at predetermined time intervals, and means cooperative with said cam for resetting said dash pot when said tool is rotated.

13. A damming device comprising, in combination, a draft member having a closed cylindrical portion and an enclosed housing portion, a transverse shaft journaled in said housing and extending laterally therefrom, a scraper tool fixed on the extended portion of said shaft and rotatable out of and into earth-engaging position, detent means disposed within said housing portion for normally holding said tool against rotation and in earth-engaging position, dash pot means disposed within said cylindrical portion and operatively connected with said detent means to disable the latter after a predetermined time interval, and means actuated by rotation of said tool for resetting said dash pot means.

14. A flexible connection for attaching an implement to a supporting bracket comprising, in combination, a plate, a pair of vertically spaced rubber pads and a pair of horizontally spaced rubber pads, means for connecting said plate with said supporting bracket including one of said pairs of pads interposed therebetween, and means for connecting said plate with said implement including the other of said pairs of pads interposed therebetween.

15. A flexible connection for attaching a damming device to a furrow forming implement comprising, in combination, a plate, vertically spaced means for connecting said plate to said furrow forming implement including resilient pads disposed therebetween, and laterally spaced means for connecting said plate to said damming device including resilient pads disposed therebetween.

16. In a damming device the combination of a draft member having an enclosed housing portion, a shaft journaled in said housing portion and extending laterally therefrom, a scraper tool fixed on the extended portion of said shaft and rotatable out of and into earth engaging position, means disposed within said housing portion for normally holding said shaft against rotation, and means responsive to the height of accumulated earth in front of said tool for disabling said holding means thereby allowing said tool to rotate and deposit the accumulated soil as a dam.

17. A damming device comprising, in combination, a draft member, a rotary scraper blade assembly journaled on said draft member and rotatable out of and into earth engaging position, detent means for normally holding said assembly against rotation, timing means including a dashpot for disabling said detent means to allow said scraper assembly to rotate and deposit accumulated soil to form a dam, and means responsive to the rotation of said scraper assembly for resetting said timing means.

18. A device of the class described, comprising in combination, a hollow draft member, a shaft journaled in said draft member and extending laterally therefrom, a ground engaging blade fixed on the extended portion of said shaft, a controllable element disposed within said draft member and movable longitudinally therein, means operatively connecting said controllable element with said shaft restraining rotation of the latter when said controllable element is in one position in said draft member, said shaft being permitted to rotate when said controllable element is in another position, and control means for controlling the position of said controllable element.

19. A device of the class described, comprising in combination, a tubular member, a transverse shaft rotatably mounted at the rear end thereof, a ground engaging blade mounted on said shaft and rotatable therewith into and out of earth engaging position, a controllable element disposed within said tubular member and slidable longitudinally therein, means operatively connecting said controllable element with said shaft restraining rotation of the latter when said controllable element is in one position in said draft member, said shaft being permitted to rotate when said controllable element is in another position, and control means for controlling the position of said controllable element.

20. A device of the class described, comprising in combination, a tubular member, a transverse shaft rotatably mounted at the rear end thereof, a ground engaging blade mounted on said shaft and rotatable therewith into and out of earth engaging position, a controllable element disposed within said tubular member and slidable longitudinally therein, means operatively connecting said controllable element with said shaft restraining rotation of the latter when said controllable element is in one position in said draft member, said shaft being permitted to rotate when said controllable element is in another position, and control means for controlling the position of said controllable element, said control means comprising piston means attached to said controllable element and slidable within a portion of said tubular member serving as a cylinder therefor, and means including an adjustable valve connected with said cylinder for controlling the flow of a fluid relative to said cylinder and thereby controlling the movement of said piston.

21. A flexible connection for attaching an implement to a draft device comprising a metallic member directly connected at one end to said implement and at the other end to said draft device and adapted to transmit stresses in tension from the implement to the draft device as the implement is drawn forwardly, and a resilient member encircling said metallic member and disposed between said implement and said draft device, said resilient member being stressed in compression as the implement swings relative to the draft device.

22. A flexible connection for attaching an implement to a draft device comprising a bolt directly connected at one end to said implement and at the other end to said draft device, said bolt being the sole draft transmitting means therebetween as the implement is drawn forwardly, and a resilient bushing encircling said bolt and clamped by the latter between said implement and said draft device, said bushing being compressed as the implement swings relative to said draft device.

23. A flexible connection for attaching a damming device to a furrow forming implement comprising a pair of spaced bolts connecting said damming device to said implement and adapted to be stressed in tension as the damming device is drawn forwardly, and a resilient bushing encircling each of said bolts and adapted to be stressed in compression as the damming device swings relative to said implement.

24. A damming device comprising in combination, a hollow draft member, a shaft journaled in said draft member and extending laterally therefrom, a ground engaging earth collecting blade fixed on the extended portion of said shaft, a rod disposed within said draft member and movable longitudinally therein, means operatively connecting said rod with said shaft restraining rotation of the latter when said rod is in one position in said draft member, said shaft being permitted to rotate when said rod is in another position, and means responsive to the height of the pile of earth collected by said blade for controlling the position of said rod.

25. A device of the class described, comprising in combination, a tubular member, a transverse shaft rotatably mounted at the rear end thereof, a ground engaging blade mounted on said shaft and rotatable therewith into and out of earth engaging position, a rod disposed within said tubular member and slidable longitudinally therein, means operatively connecting said rod with said shaft restraining rotation of the latter when said rod is in one position in said draft member, said shaft being permitted to rotate when said rod is in another position, and control means for controlling the position of said rod, said control means comprising a gauge arm associated with said blade and adapted to lie on the pile of material collected by said blade during forward movement of the latter in earth engaging position, and means connecting said arm with said rod for effecting a change of position of said rod responsive to a change of position of said arm.

26. A damming device comprising, in combination, a hollow draft member, a shaft journaled in said draft member and extending laterally therefrom, a scraper blade fixed on the extended portion of said shaft, a cam fixed on said shaft, detent means adapted to engage said cam and prevent said shaft from rotating, means disposed within said hollow draft member and operatively engaging said detent means to disengage the latter from said cam and permit said shaft to rotate, and means responsive to the height of the pile of earth collected by said blade during forward movement of the latter in earth engaging position, for actuating said detent disengaging means.

27. A damming device comprising, in combination, a draft member, a rotary scraper blade assembly journaled on said draft member and rotatable out of and into earth engaging position, a detent wheel fixed to said assembly and rotatable therewith, a detent engageable with said wheel for normally holding said assembly against rotation during forward movement of said device with said blade in earth engaging position, a detent rod mounted on said draft member and movable longitudinally relative thereto to move said detent into and out of engagement with said detent wheel, and means for controlling the position of said detent rod.

28. A damming device comprising, in combination, a draft member, a rotary scraper blade assembly journaled on said draft member and rotatable out of and into earth engaging position, a detent wheel fixed to said assembly and rotatable therewith, a detent engageable with said wheel for normally holding said assembly against rotation during forward movement of said device with said blade in earth engaging position, a detent rod mounted on said draft member and movable longitudinally relative thereto to move said detent into and out of engagement with said detent wheel, and means for controlling the position of said detent rod, said control means comprising a gauge arm associated with said blade and adapted to lie on the pile of material collected by said blade during forward movement of the latter in earth engaging position, and means connecting said arm with said rod for effecting a change of position of said rod responsive to a change of position of said arm.

29. A damming device comprising, in combination, a draft member having a hollow sleeve portion and an enclosed housing portion, a shaft journaled in said housing portion and extending laterally therefrom, a scraper blade fixed on the extended portion of said shaft, a cam fixed on said shaft and disposed within said housing portion, a detent member pivotally supported within said housing portion and adapted to engage said cam to hold said shaft against turning, a push rod disposed within said sleeve portion and axially movable relative thereto, said push rod cooperating with said detent member to hold the latter in engagement with said cam, and control means for moving said push rod relative to said sleeve to cause said detent member to release said cam, said control means comprising a gauge arm associated with said blade and adapted to lie on the pile of material collected by said blade during forward movement of the latter in earth engaging position, and means connecting said arm with said rod for effecting a change of position of said rod responsive to a change of position of said arm.

30. A damming device comprising a rotatable earth-engaging tool having earth-engaging parts, each adapted to operate in a furrow behind a furrow-forming implement by lightly scraping the walls of said furrow to accumulate soil in front of the tool, said tool being movable out of earth-engaging position by resistance of the soil as the tool is moved forwardly, for depositing the accumulated soil in the furrow to form a dam, mechanism for holding said tool in any one of several positions, with one or the other of said parts accumulating soil to form a dam, the pressure of the soil against said part tending to rotate the tool to a new position, time-controlled means movable at an approximately constant rate from one position to another for releasing said tool to permit it to rotate and pass over the accumulated soil and to bring another part into soil-engaging position, and means energized by the rotation of said tool for moving said time-controlled means back into said one position.

31. In a damming device, an earth engaging tool adapted to operate in a furrow behind a furrow forming implement by lightly scraping the sides of said furrow to accumulate soil in front of the tool, said tool being movable out of earth engaging position by resistance of the soil as the tool is moved forwardly, for depositing the accumulated soil in the furrow to form a dam, means acting against said tool to hold the same against movement under the pressure of soil thereagainst, means operable by the movement of said tool out of earth engaging position to deposit the accumulated soil for resetting said tool holding means, and means operable after a given period of time following the resetting of said holding means for releasing the latter during forward travel at either constant or varying speed to deposit the accumulated soil.

32. A damming device comprising a controllable earth-engaging tool adapted to operate in a furrow behind a furrow-forming implement by lightly scraping the walls of said furrow to accumulate soil in front of the tool, said tool being movable out of earth-engaging position by resistance of the soil as the tool is moved forwardly, for depositing the accumulated soil in the furrow to form a dam, biased means for controlling the movement of said tool out of earth-engaging position at substantially evenly spaced predetermined time intervals during forward travel at substantially constant speed of the implement, and means energized by the movement of said tool due to soil pressure thereagainst for biasing said controlling means.

33. In a damming device, a damming tool movable into and out of earth engaging position during forward travel of said device, means for holding said tool in earth engaging position to collect soil for forming a dam, means for releasing said holding means to accommodate movement of said tool momentarily out of earth engaging position to deposit the soil collected and form a dam, and means whereby one of said means is time-controlled so as to be operative during forward travel at either constant or varying speed.

WALTER H. SILVER.